(12) United States Patent
Staab et al.

(10) Patent No.: US 7,627,448 B2
(45) Date of Patent: Dec. 1, 2009

(54) APPARATUS AND METHOD FOR MAPPING AN AREA OF INTEREST

(75) Inventors: Torsten A. Staab, Los Alamos, NM (US); Daniel L. Cohen, Ithaca, NY (US); Samuel Feller, Fairfax, VA (US)

(73) Assignee: Los Alamost National Security, LLC, Los Alamos, MN (US)

( * ) Notice: Subject to any disclaimer, the term of this patent is extended or adjusted under 35 U.S.C. 154(b) by 273 days.

(21) Appl. No.: 11/877,065

(22) Filed: Oct. 23, 2007

(65) Prior Publication Data

US 2009/0105986 A1     Apr. 23, 2009

(51) Int. Cl.
G01C 9/00  (2006.01)
(52) U.S. Cl. .................. 702/152; 702/154; 702/159; 342/357.08; 342/357.11
(58) Field of Classification Search ......... 702/151–154, 702/159; 342/357.08, 357.11
See application file for complete search history.

(56) References Cited

U.S. PATENT DOCUMENTS

| | | | |
|---|---|---|---|
| 4,333,242 A | 6/1982 | Genho, Sr. | |
| 5,638,164 A | 6/1997 | Landau | |
| 5,644,317 A | 7/1997 | Weston et al. | |
| 5,689,330 A | 11/1997 | Gerard et al. | |
| 6,027,257 A | 2/2000 | Richards et al. | |
| 6,198,528 B1 | 3/2001 | Maynard | |
| 6,608,913 B1 | 8/2003 | Hinton et al. | |
| 7,063,620 B2 | 6/2006 | Nearhood | |
| 2003/0231793 A1 | 12/2003 | Crampton | |
| 2004/0122628 A1 | 6/2004 | Laurie | |

*Primary Examiner*—Drew A Dunn
*Assistant Examiner*—Hien X Vo
(74) *Attorney, Agent, or Firm*—Husch Blackwell Sanders LLP

(57) ABSTRACT

An apparatus and method are provided for mapping an area of interest using polar coordinates or Cartesian coordinates. The apparatus includes a range finder, an azimuth angle measuring device to provide a heading and an inclinometer to provide an angle of inclination of the range finder as it relates to primary reference points and points of interest. A computer is provided to receive signals from the range finder, inclinometer and azimuth angle measurer to record location data and calculate relative locations between one or more points of interest and one or more primary reference points. The method includes mapping of an area of interest to locate points of interest relative to one or more primary reference points and to store the information in the desired manner. The device may optionally also include an illuminator which can be utilized to paint the area of interest to indicate both points of interest and primary points of reference during and/or after data acquisition.

24 Claims, 4 Drawing Sheets

APPARATUS AND METHOD FOR MAPPING AN AREA OF INTEREST

STATEMENT REGARDING FEDERAL RIGHTS

This invention was made with government support under contract number DE-AC52-06NA25396 awarded by the U.S. Department of Energy. The government has certain rights in the invention.

BACKGROUND OF INVENTION

The mapping of areas for location of objects and evidence has long been done. For example, fatal accident scenes are mapped in order to preserve the location of evidence and to identify spots that may need to be returned to for further searching for evidence. Crime scenes may also need to be mapped accurately. Other areas that could benefit from accurate mapping include archeological digs, mining, industrial areas for hygiene, architectural sites and the like. Current mapping methods include such simple things as drawing an area on a piece of paper and with the use of a tape measure, measuring the distance to points of interest within the area of interest and recording them on the paper. Traditional surveying can be used but that generally requires more than one person to accomplish the survey and it tends to be slow. Additionally, those operating the survey equipment may not be as skilled as desired affecting the accuracy of the map leading to potential challenges should the exact location of an item or point be disputed or critical. Photographic techniques may be used as well but lack accuracy of location. With the advent of accurate GPS (Global Positioning System), accurate mapping of an area may be done without measuring tools. However, with GPS systems, fine distinctions for a change in altitude, for example, a one or two foot change may not be that accurate. Additionally, the satellite signals needed by the GPS may be shielded, preventing use of a GPS device. High accuracy GPS systems can measure locations quite accurately in X-Y coordinates or a horizontal plane. However, high accuracy GPS systems are very expensive and may require a highly skilled operator to use. Further, they require the manual inputting of data to preserve what was where. They may also be difficult to use to precisely locate a point of interest on a sloped or vertical surface, for example, the wall of a room.

Thus, there is a need for an improved mapping method and apparatus that will provide accurate and repeatable data on the location of points of interests in an area of interest and that can be easily and simply used by people not having skill in surveying.

SUMMARY OF INVENTION

The present invention involves the provision of a method of mapping an area of interest and locating points of interest within the area. The method includes identifying an area of interest. At least one primary reference point is identified within the area of interest and a location of the primary reference point is determined relative to a mapping apparatus including a range finder, azimuth angle measuring device and an elevation angle measuring device. A wave is projected onto a first point of interest and sensed by a sensor upon reflection from a point of interest. The location of the point of interest is determined by measuring at least one of azimuth angle, elevation angle and range from a reference point on the mapping apparatus. A second location of the first point of interest relative to the apparatus and/or to the primary reference point(s) may be calculated and recorded.

The present invention also involves the provision of an apparatus for locating a point of interest relative to at least one primary reference point. The apparatus includes a range finder having a wave projector and a wave sensor operable to measure distance to a point of interest and provide a first signal indicative of the distance or range to the point of interest. A compass may be provided and is associated with the range finder and is operable to provide a second signal indicative of an absolute heading for the range finder. An azimuth angle measuring device is provided to measure azimuth angle between points and provide a third signal indicating azimuth angle. An elevation angle measuring device is associated with the range finder and is operable to provide a fourth signal indicative of the inclination for the range finder. A computer is operably associated with the range finder, azimuth angle measuring device, compass and elevation angle measuring device to receive the first signal, second signal, third signal and fourth signal and calculate a three dimensional location of the point of interest and a primary reference point in an area of interest from the range finder and calculate the coordinates of the point of interest relative to at least one primary reference point.

BRIEF DESCRIPTION OF DRAWINGS

Like numbers throughout the drawings represent like and/or similar parts and/or construction.

DETAILED DESCRIPTION

Figure 1:
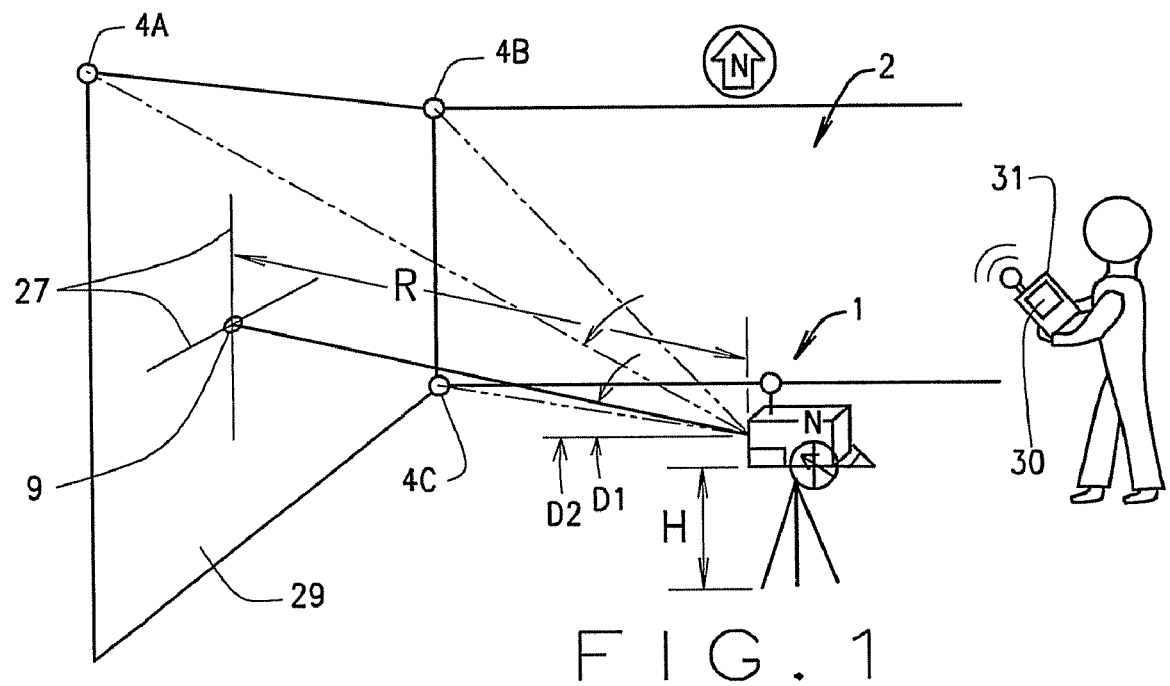
FIG. 1 is a schematic illustration of a mapping apparatus shown in an area of interest.

The reference numeral 1 designates generally an apparatus operable for mapping an area of interest 2 (FIG. 1). The apparatus 1 is useful for locating itself either by polar (spherical) coordinates or XYZ (Cartesian) coordinates from at least one primary reference point 4 by utilizing a compass heading taken from a compass 5 and range R provided by a range finder 6 and an elevation angle provided by an inclinometer device 7. The apparatus 1 may be mounted on a tripod 10 or other suitable support to be at an elevation (height) H measured from the floor if desired. The height (H) may be measured by a second range finder 8. The point of interest 9 is located and its location is determined relative to a reference point 12 on the apparatus 1 and then a computing device 9 calculates the location of the point of interest 9 relative to one of the apparatus 1 reference point 12 in a suitable coordinate system and/or a primary reference point 4. As seen in FIG. 1, three primary reference points are shown and are denoted 4A, 4B, 4C for distinction. The apparatus 1 may be used for a second mapping of the area 2 and may be provided with a beam projector 11 which will paint the area of interest with the primary reference points 4 and the points of interest 9 at a later time not requiring that the apparatus 1 be positioned exactly as it was during the initial mapping. The projector 11 is preferably operable to illuminate the location of a point of interest 9 or primary reference point 4 either during a mapping session, or during a paint session showing earlier determined points.

The area of interest 2 may be any area that is within the operating range of the apparatus 1. It may include an enclosed room, an outdoor area or a partially enclosed space. It may include a crime scene, a forensic scene, for example, an area containing contamination sites or an accident scene. The area of interest 2 will include at least one primary reference point 4 for establishing the location of the apparatus 1 and its reference point 12 within the area of interest. While one primary reference point 4 will suffice, it is preferred that a plurality of primary reference points be used to establish the location of the apparatus 1 and the point(s) of interest 9. It is to be understood that a point of interest 9 may be used as a primary reference point 4. Preferably, the area of interest 2 will contain a plurality of primary reference points 4 and most preferably three primary reference points. The primary reference points 4 are fixed, easily identified and relocatable and preferably are anticipated as remaining fixed relative to the remainder of the area of interest so that the apparatus 1 can be relocated in the area of interest accurately, if desired. By way of example, the primary reference points may be corners in a room which will remain substantially fixed in position relative to other points in a room and can be readily and accurately identified. In an outdoor setting, the primary reference points may include such things as a tree, rock or the like. However, the use of large objects as a primary reference point 4, may make the use of additional primary reference points for location desirable in order to obtain the desired accuracy of the location of points of interest 9 and the apparatus 1.

A suitable compass 5 is used to provide the angle of heading from the apparatus 1 to the primary reference points 4 and point(s) of interest 9. Although the exact heading (absolute angle) by degrees from north or some other reference direction on the compass is not critical and given magnetic declination in various areas of the world or local magnetic field disruptions, e.g., large magnetic objects, may not provide adequate or repeatable accuracy. The compass 5 is used to provide a general heading and orientation of the apparatus 1. A GPS device 13 may also be provided to provide a general absolute location of the apparatus 1, e.g., latitude, longitude and altitude. What is important, is the angle between the various points which can be accurately measured irrespective of local magnetic declination or disturbance so no adjustment need be made for declination at a given site although it could be if desired. Using angles and/or distances between points eliminates the need for checking magnetic declination at a site for mapping or for painting of a pre-mapped site. Any suitable compass 5 can be used that provides the desired degree of accuracy and resolution. It is preferred that an electronic compass 5 be used because its readings can be provided as an electric signal to the computer device 14 automatically or upon instruction by a user of the apparatus 1. The GPS 13 may also be connected to the computer 14 to provide a signal indicating the general location of the apparatus 1. A suitable electronic compass is a CMPS03 manufactured by Devantech. It provides an accuracy of about 3-4° and a resolution of about 0.1°. Preferably, the accuracy of the angles between primary reference points 4 and points of interest 9 should be about 0.1° or smaller and more preferably smaller than about 0.05°. The computer 14 can be any suitable digital device capable of data acquisition and preferably data processing and apparatus control.

An azimuth angle measuring device 16 is provided. It may be or include the compass 5 or if high accuracy is desired any suitable angle measuring device with an output signal can be used. Such devices include angle encoders, potentiometers and the like and they may be coupled to a suitable power drive 17 such as a DC brushless or stepping motor to move portions of the apparatus under power. The resolution of the azimuth angle measuring device should be at least 0.05° or smaller for high accuracy mapping. The device 16 and drive 17 can be integrated and used to provide the relative heading angle between the various points 4, 9 and the reference direction from compass 5. Rotation of the range finder 6 about a generally vertical axis can be accomplished with drive 17 through a reducing gear arrangement 25. When an angle measuring device 16 is used for azimuth angle measurement, it can provide accurate angles between points of interest 9 and primary reference points 4 to the desired degree of accuracy and resolution and provide a signal to computer 14 indicating angles and the computer 14 can calculate difference in angles. The compass 5 can then be used as an indication of the absolute general direction of the range finder 6 for orienting or reorienting the apparatus 1.

Figure 2:
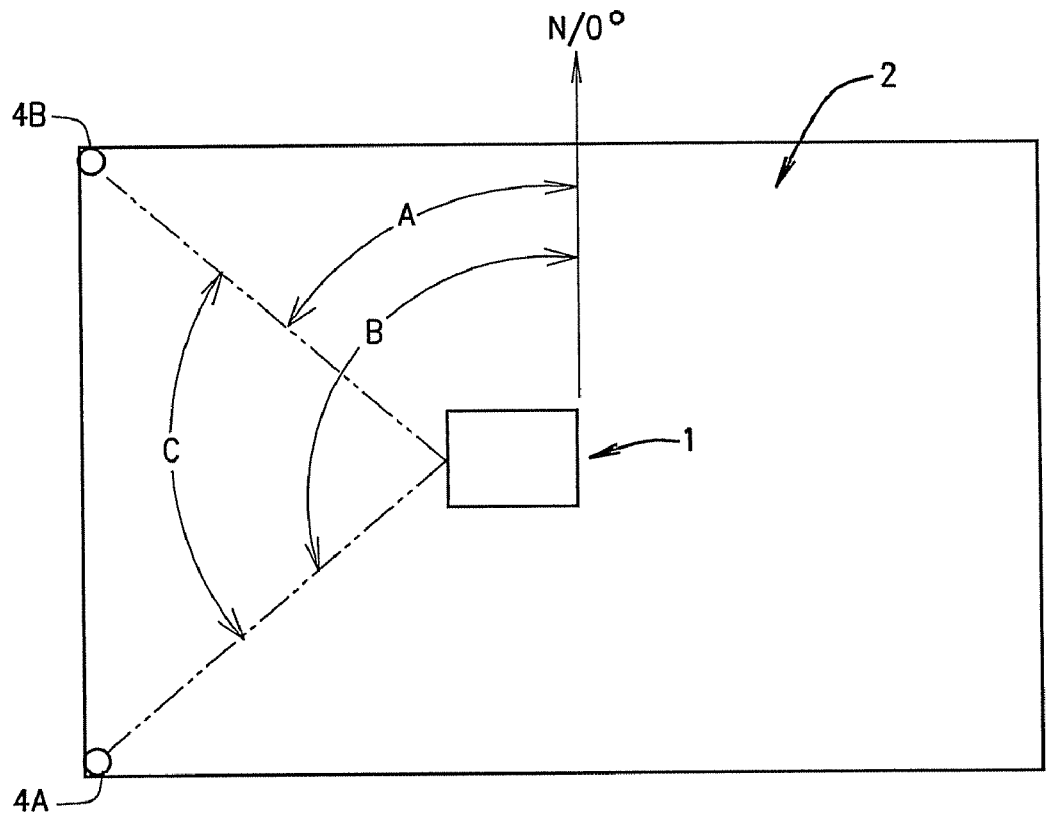
FIG. 2 is a schematic illustration of an area of interest showing various angles.
Figure 3:
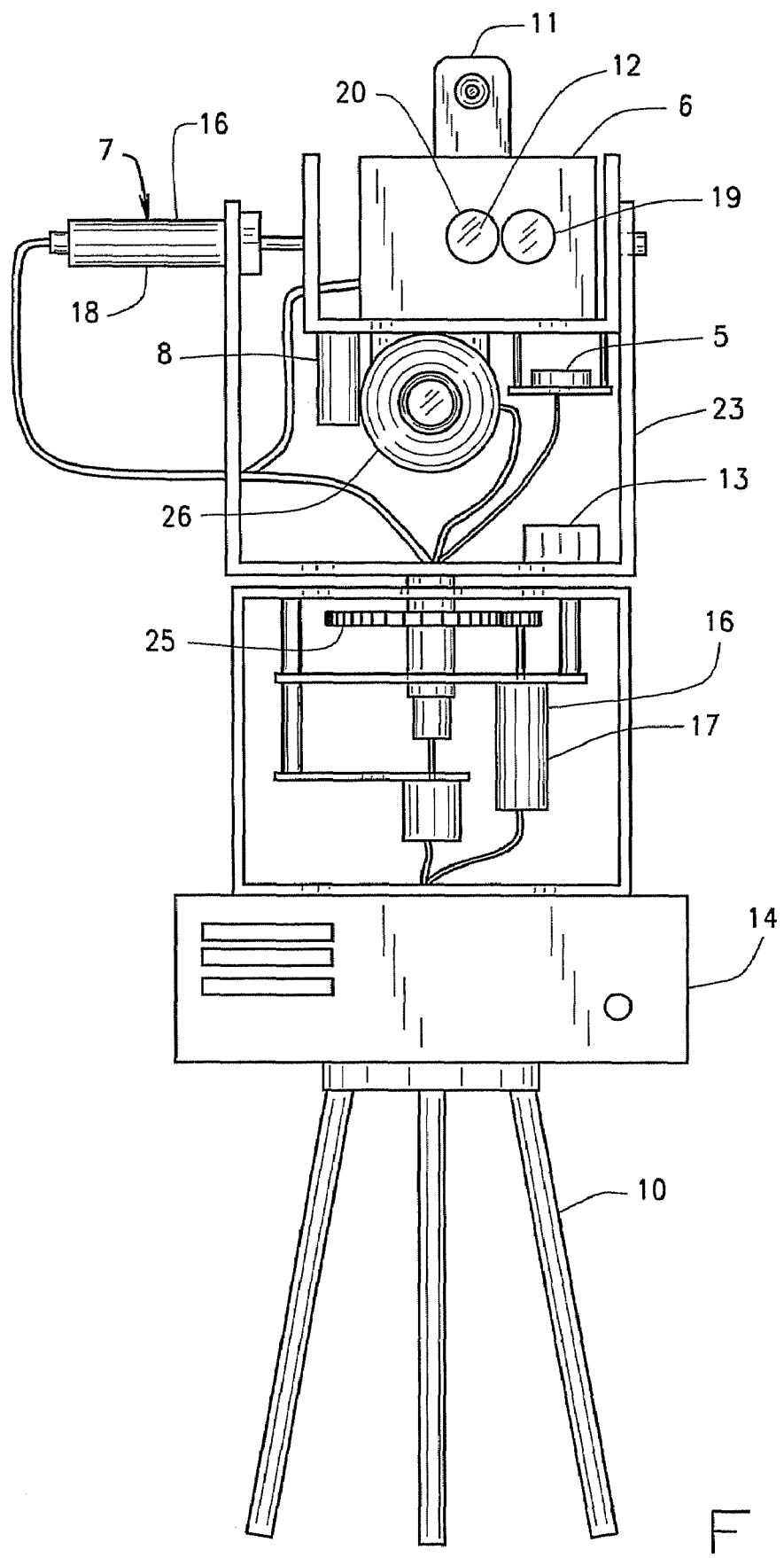
FIG. 3 is a front view of the mapping apparatus of the present invention.
Figure 4:
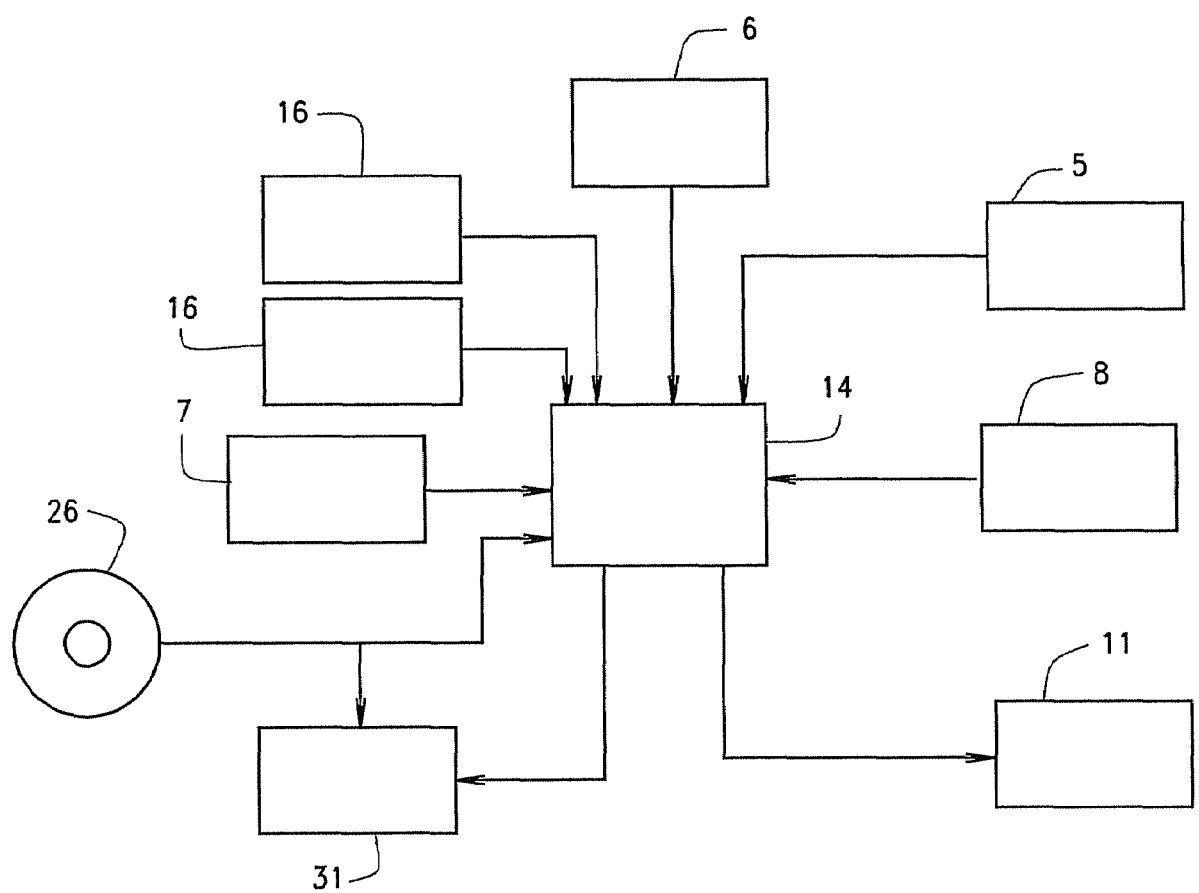
FIG. 4 is a block diagram of the components of the apparatus of the present invention.

As seen in FIG. 2, the compass 5 measures from a reference direction, for example, north or 0°, and the angles to a primary reference point(s) or a point(s) of interest are preferably measured by the device 16. Once one angle 4 is located relative to the reference direction for general reference, the difference in angles between the points 4, 9 may be measured or calculated and the data stored in computer 14 as relative angles and, if desired, as compass heading angles. For example, as seen in FIG. 2, the primary reference point 4B has an angle A measured as described below. The angle B to the reference point 4A is then measured. The difference between the two angles A, B is the angle C between the point of interest 9 and the primary reference point 4 which can be measured or calculated and stored as angle C. All three angles A, B, C as measured by device 16 and/or compass 5 can be stored for future reference in a preferred embodiment. Thus, the true orientation of the reference orientation, in this example north, may vary since, in a preferred embodiment, it is the angle C or the angle of difference, that is important in locating the point of interest 9 from the one or more primary reference points 4. Subsequent mapping or painting of the scene can be normalized even though the north reference direction is different between first and second settings of the apparatus 1 or the use of different apparatuses 1.

The range finder 6 can be any suitable range finder with the desired accuracy determining the type of range finder used. The range finder 6 preferably uses a contactless mode of measuring range. In a preferred embodiment, a wave is projected from a beam projector 19 of the range finder 6 and its reflection is sensed by a sensor 20. The range finder 6 is then operable to measure the range of either a primary reference point 4 or a point of interest 9 from a reference point 12 on the apparatus 1 like the projector 19 or sensor 20. Parallax between the projector 19 and sensor 20 can be compensated for if needed for the desired accuracy. The wave beam projected by the ranger finder 6 can be a sonic wave or an electromagnetic wave. Suitable range finders can use a visible laser light projected from the projector 19. A suitable range finder is a PD28 made by Hilti. The ranger finder 6 is operably coupled to the computer 14 and provides an output signal indicative of the range from reference point 12 of the apparatus 1 to the primary reference point(s) 4 and point(s) of interest 9.

The elevation angle measuring device 7, hereinafter inclinometer for convenience, is operable to measure the angle of inclination or angle of elevation from the range finder 6 of the apparatus 1 to the primary reference point(s) 4 or point(s) of interest 9. By knowing the angle of inclination D (D1, D2 . .

.) relative to the apparatus 1, e.g., the absolute angle of the projected beam from horizontal. The angle of inclination between the point(s) 4, and point(s) 9 can then be measured relative to one another. Again, it is the relative angle (e.g., D2-D1) that is important to locate points relative to one another. The inclinometer 7 is operable to provide an output signal to the computer 14 of the various angles of inclination. An angle of inclination can be suitably measured by an angle measuring device 16 as described above which can be coupled to or integrated with a motor drive 18 similar to motor 17. In a preferred embodiment, the angle of inclination should be accurate to about 0.1° or smaller and preferably smaller than about 0.05° with a resolution of preferably smaller than about 0.05°. The inclinometer 7 may also include a level, preferably an electronic level to provide absolute elevation angles and signals to computer 14 indicative of an absolute elevation angle.

By knowing the azimuth angles both absolutely and relatively, the primary reference points 4 and points of interest 9, and hence the angles C between the various points 4, 9 and the angles of elevation D both absolutely and relatively between the points 4, 9 and the range R of each of the points 4, 9 to a reference point 12 on the apparatus 1, the location of one or more points of interest 9 can be calculated and stored in any suitable coordinate system, polar coordinates being preferred. The storage of data in the computer 14 can be in a manner that preserves it with a chain of custody for use as evidence if desired. It is preferred to store all raw data collected and all calculated data. Time stamps on the stored data may also be provided.

The range finder 6 may be operable to provide a visible light point on the points of interest 9 and the primary reference points 4 to ensure that accurate locations of these points can be recorded and calculated for relative positions. If sound waves are used or other wave forms that are not visibly seen are used, an aiming device may be incorporated into the apparatus 1. It is to be understood that the smaller the projected beam of waves is, the higher the potential for accuracy. Thus, laser ranger finders are preferred or other range finders with sighting devices since the point of exposed light can be used to help mark points of interest 9 and primary reference points 4 for measurements. The range finder 6 may be compensated for parallax between the projector 19 and the sensor 20 and the reference point 12, if needed for accuracy.

In the illustrated structure, the apparatus 1 may be provided with a motor 17 to rotate the mount 23 about a generally vertical axis and hence move the range finder 6 and illuminating projector 11 to various azimuth directions as desired. The motor 17 can include the angle measuring device 16 which can show the change in degree of rotation of azimuth of the range finder 6 about the axis of rotation. A suitable angle measuring device 16, 18 is an E3-2048-250-1-1 available from US Digital. Reduction gearing 25 can be used to increase azimuth angle resolution, i.e., make smaller angles of movement detectable. In a preferred embodiment, the horizontal and vertical axes of rotation of the range finder 6 pass through the point 12.

A digital camera 26, e.g., a still camera or a video camera, can be provided. The camera 26 can record the locations of the various primary reference points 4 and the various points of interest 9 during their acquisition to provide a visual record of the mapping process. Such recording is evidentiary in the event the locations are challenged in any manner, for example, in court, management meetings, scene painting or the like.

Further refinement of the general position of the reference point 12 on the apparatus 1 and the points 4, 9 can be provided by knowing the height of the reference point 12 of apparatus 1 from the ground. The height can be determined for example by a sonic distance measuring device 8. The height detecting device 8 is operably coupled to the computer 14 to provide a signal thereto indicative of the height of the apparatus 1 and hence the height of the reference point 12 on the apparatus 1. Any arbitrary position on the apparatus 1 can be detected and normalized or adjusted for parallax by adding or subtracting distance. When using only one primary reference point 4 for measurements, the height measuring device 8 can be used to increase accuracy. All measurements can be normalized to the point 12 of one of the components of the apparatus 1 for example the range finder 6 and preferably the sensor 19 of the ranger finder 6.

In a preferred embodiment, an illuminating projector 11 can be included in the apparatus 1. The projector 11 is operable to project a light beam or beams preferably in the form of crosshairs i.e., two lines of light at 90° relative to one another. The illuminator 11 can be utilized during mapping to locate an approximate point during aiming of the apparatus 1 at either a point of interest 9 or a primary reference point 4. The illuminator 11 can also be used during painting of a scene, i.e., the use of the apparatus 1 after mapping to show the primary reference points 4 and points of interest 9 after the locations have been calculated or measured and stored in memory of the computer 14. If the apparatus 1 is reused in an area of interest 2, it can be used to reacquaint itself with the primary reference points 4 that were originally used for mapping and can re-calculate where the points of interest are even though the apparatus 1 is at a new location. The apparatus 1 and its projector 11 can show for example where a specific point of interest 9 is located by illuminating that point with the projected beam(s) of light 27. For example, if anthrax spores were located on a wall 29 and its location was stored in the computer 14, or another storage device associated with the computer, e.g., a CD, DVD, hard drive or memory card, the apparatus 1 can automatically go to that location and indicate the same with the light beam(s) from the projector 11. Thus, it can be seen that the apparatus 1 provides a simple but highly accurate location finding device that is relatively inexpensive as compared to such things as accurate GPS systems. The inventive apparatus 1 can be more accurate than manual measurement systems including many types of surveying. In addition, the apparatus 1 is also quicker to operate and can be utilized by one person effectively.

The apparatus 1 may be operated from the computer 14 directly. The computer 14 may be provided with a graphical user interface (GUI) allowing ease of use through a touch screen 30 on the computer 14 or via a remote control device 31 which could be wireless or wired to the computer 14. Remote control allows the apparatus 1 to be used in a hazardous environment. The control device may also include a cell phone or other handheld device. The apparatus 1 can also be constructed to utilize voice commands such as "Move", "Fast", "Slow", "Up", "Down", "Left", "Right", "Stop", "Start" and "Store". Additionally, the apparatus 1 can be constructed to sense a light beam, for example, from a handheld laser pointer, and automatically go to a point of interest or a primary reference point as indicated by the laser pointer under the control of the operator. Alternatively, the integrated camera 26, in combination with widely available object tracking software, can be used to automatically and autonomously track the position of the sample collector. In this case, point of interest teaching (i.e., recording) can be achieved via software-based, real-time image processing of visual clues (e.g., sample collector pointing with his/her finger at a point of interest). Such operation can be both during data acquisition and subsequent scene painting by the apparatus 1.

In the simplest case, two points, 4 and/or 9 are to be considered. The location of the two points relative to one another and to the apparatus 1 are to be determined. By knowing two ranges or distances and one absolute angle, for example, the angle from horizontal or the angle from an arbitrary azimuth position for example north, can be measured and the locations of the points determined. Alternately, if three ranges are known, for example, the ranges to two points as just described and a range to third point, the locations of the two points and also of the third point are known relative to one another and the apparatus 1. Additionally, if one range and two absolute angles are known, the locations of the two points relative to one another and relative to the apparatus 1 can be determined. By knowing the locations of additional points and angles, spacial locations of the various points of interest and/or primary reference points can be readily determined.

Figure 5:
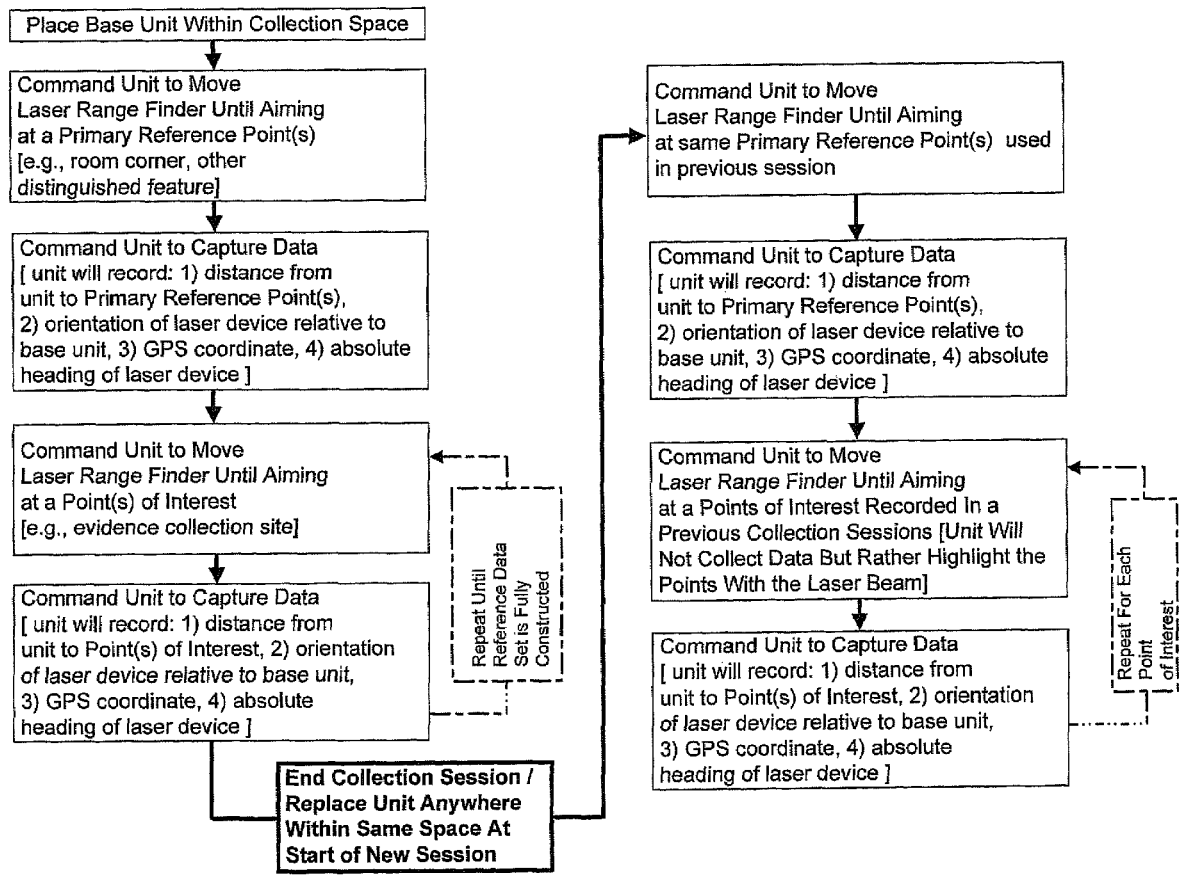
FIG. 5 is a flow chart illustrating a mode of operation of the mapping apparatus.

FIG. 5 shows a flow chart illustrating one mode of operating the apparatus 1. The inclinometer 7 and compass 5 enable the system to home itself such that the coordinate systems of all data collection sessions are standardized (i.e., the plus Y axis points north and the X-Y plane is parallel to the ground). Clouds of the primary reference points 3 and points of interest 9 from one or more data collection sessions are already rotationally registered since their coordinate systems were standardized. In order to fully register the reference point data sets, all that is needed is translational alignment. By using the inclinometer 7 and the compass 5, as well as input by a user, to select the desired points 4, 9, the localization problem can be reduced to a more constrained, simple problem—with the only computation needed for a data set registration is a translational alignment.

The translational alignment can be achieved using centroid matching and subsequent stepwise computational shifting to reduce the least squares error. The translations needed to align the referenced clouds of relevant points 4 and/or 9, yields relative position vectors from the apparatus 1 to its previous location(s). The relative position vector gives the system an understanding of its position relative to the positions of the apparatus 1 during previous mapping sessions. Knowing the position of the apparatus 1, relative to previous positions, the system can laser paint previously recorded locations using beams of light from the projector 11 as a marker without the apparatus 1 having to be placed in the same location as it was during mapping. An operator may simply place the apparatus 1 in the same room or space, input fresh primary reference points 4 and the unit can highlight the previously captured points of interest 9.

The apparatus 1 can be used without markers for location recording reducing the risk of site contamination or risking a person to exposure to a potentially contaminated spot. A site may be revisited even after alteration, e.g., painting, and the points of interests can be accurately located. The method is a non-invasive method.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A method of mapping an area of interest, the method comprising:
   identifying an area of interest;
   placing a mapping apparatus adjacent the area of interest;
   identifying at least one primary reference point in the area of interest;
   projecting a wave onto a first said primary reference point;
   sensing the wave reflected from the first primary reference;
   determining a first location of the first primary reference point relative to a reference point on the mapping apparatus by at least one of range, azimuth angle and elevation angle;
   projecting a wave onto a first point of interest;
   sensing the wave reflected from the first point of interest;
   determining a second location of the first point of interest relative to a reference point on the mapping apparatus by at least one of range, azimuth angle and elevation angle;
   calculating a third location of the first point of interest relative to the first location of at least one said primary reference point; and
   recording the third location.

2. The method of claim 1 wherein at least one of the first and second locations being in polar coordinates.

3. The method of claim 1 wherein at least one of the first and second locations being in Cartesian coordinates.

4. The method of claim 1 wherein the ranges being determined using a range finder and the azimuth and elevation angles each being measured by a respective angle measuring device, said range finder and angle measuring devices sending signals indicative of measured values to a digital data acquisition device.

5. The method of claim 4 wherein the wave including light.

6. The method of claim 5 wherein the light is projected from a light source fixed in position relative to the sensor.

7. The method of claim 5 wherein light is projected onto at least one of a point of interest and a primary reference point from a second light source randomly positioned relative to the sensor and the apparatus sights in on the location of the light on the at least one of a point of interest and a primary reference point.

8. The method of claim 5 determining the respective location of a plurality of primary reference points.

9. The method of claim 8 wherein the location of at least two primary reference points being determined.

10. The method of claim 9 wherein the location of the primary reference points being determined prior to determining the second location.

11. The method of claim 10 wherein at least some of the azimuth angles being determined with an angle encoder.

12. The method of claim 11 wherein the ranges being determined by a laser range finder operable to project a laser beam.

13. The method of claim 12 wherein a laser beam being projected onto at least one of the primary reference points and points on interest from a point fixed relative to the sensor.

14. The method of claim 12 wherein a laser beam being projected from a point movable relative to the sensor.

15. The method of claim 4 wherein the first and second locations being determined using at least: two ranges and one absolute azimuth or elevation angle; three ranges; or one range and two absolute angles selected from azimuth and elevation angles.

16. An apparatus for locating a point of interest relative to at least one primary reference point, said apparatus including:
- a range finder including a wave projector and wave sensor operable to selectively measure distance to a point of interest and a primary reference point and provide first signals indicative of distance to the point of interest and primary reference point;
- at least one of an electronic azimuth angle measuring device operably associated with the range finder and operable to provide second signals indicative of azimuth angles for the range finder and an electronic inclinometer operably associated with the range finder and operable to provide third signals indicative of angles of inclination of the range finder; and
- a digital data acquisition device operably associated with the range finder and the at least one of the azimuth angle measuring device and the inclinometer to receive the first signals and at least one of the second and third signals and calculate a three dimensional location of a point of interest and a primary reference point in an area of interest from an apparatus reference point and store the received signals.

17. The apparatus of claim 16 wherein the apparatus includes both the azimuth angle measuring device and the inclinometer and the digital data acquisition device including a digital computer operable to calculate a three dimensional location of a point of interest relative to a primary reference point.

18. The apparatus of claim 17 wherein the computer including a graphical user interface.

19. The apparatus of claim 17 wherein the azimuth measuring device including an angle encoder motor.

20. The apparatus of claim 19 wherein the azimuth measuring device further including an electronic compass.

21. The apparatus of claim 20 wherein the wave projector including a laser light projector.

22. The apparatus of claim 21 wherein the inclinometer including an angle encoder.

23. The apparatus of claim 22 including a digital camera directed generally in the direction of a beam from the wave projector.

24. The apparatus of claim 23 including a second wave projector operably connected to the computer and operable to selectively project a visible beam of light onto a point of interest and a primary reference point based on data stored in the computer.

* * * * *